United States Patent
Wobber et al.

(10) Patent No.: US 7,865,934 B2
(45) Date of Patent: *Jan. 4, 2011

(54) ACCESS-CONTROL PERMISSIONS WITH INTER-PROCESS MESSAGE-BASED COMMUNICATIONS

(75) Inventors: Edward P. Wobber, Menlo Park, CA (US); Manuel A Fahndrich, Seattle, WA (US); Ulfar Erlingsson, San Francisco, CA (US); Martin Abadi, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1040 days.

This patent is subject to a terminal disclaimer.

(21) Appl. No.: 11/419,145

(22) Filed: May 18, 2006

(65) Prior Publication Data

US 2007/0271594 A1    Nov. 22, 2007

(51) Int. Cl.
*H04L 29/00* (2006.01)
(52) U.S. Cl. ............... 726/2; 719/313; 719/330; 713/153; 726/4; 726/26
(58) Field of Classification Search ............ 726/2–4, 726/26; 709/9, 225; 711/147–153; 713/182–186, 713/157, 153; 719/310, 313, 330
See application file for complete search history.

(56) References Cited

U.S. PATENT DOCUMENTS

| | | | |
|---|---|---|---|
| 7,035,850 B2* | 4/2006 | Arai et al. ............... | 707/6 |
| 7,062,780 B2* | 6/2006 | Leerssen et al. ........... | 726/5 |
| 2004/0199763 A1* | 10/2004 | Freund .................. | 713/154 |
| 2006/0015740 A1* | 1/2006 | Kramer ................. | 713/182 |
| 2006/0230281 A1* | 10/2006 | Hofmann ............... | 713/182 |
| 2007/0256080 A1* | 11/2007 | Smith et al. ............. | 719/313 |

FOREIGN PATENT DOCUMENTS

WO    WO 2005/079469 A2 *  9/2005

* cited by examiner

Primary Examiner—Carl Colin
Assistant Examiner—Hee Song
(74) Attorney, Agent, or Firm—Lee & Hayes, PLLC (57) ABSTRACT

Described herein are one or more implementations that facilitate message-passing over a communication conduit between software processes in a computing environment. More particularly, the implementations described restrict access of one process to another via messages passed over a particular conduit connecting the processes and the access-control restrictions are defined by a contract associated with that particular conduit.

13 Claims, 3 Drawing Sheets

ACCESS-CONTROL PERMISSIONS WITH INTER-PROCESS MESSAGE-BASED COMMUNICATIONS

BACKGROUND

Generally, operating systems (OSs) provide some mechanism for communication among software processes. Inter-process communication is often defined by interfaces that specify a vocabulary and patterns (e.g., protocols) for communication. Such inter-process communication allows software processes to exchange data and signal events.

Some conventional OSs which allow inter-process communication employ mechanisms to exercise control over that communication. One of the common control mechanisms uses an Access-Control List (ACL). An ACL is a data structure (e.g., a list or table) that informs an OS which permissions (i.e., access rights or privileges) that each executing software process has to a specific system object (e.g., file, directory, user, etc.) or another process. Examples of common permissions include reading, writing, and executing.

When an access request is made, a conventional OS identifies the requester (i.e., a process seeking access), the kind of access being requested, and the target object of the request. The conventional OS opens the ACL associated with the target object and looks-up the requester to see if the requester is allowed access. If a match is found, the OS determines whether the kind of access that has been requested is permitted. If permitted, the OS allows the requested access. If not permitted, the OS does not allow the requested access.

However, conventional ACL approaches usually use a fixed set of possible permissions (such as read, write, and execute). Primarily, this is performed to create a defined data structure (e.g., a table) for the ACL. However, a fixed set of permissions does not allow for flexibility in providing permission for finer granularity in the existing access types or for new types of accesses.

The ACL approach is also used by other systems and computing components, such as the communications system, file system, security system, and the like.

SUMMARY

Described herein are one or more implementations that facilitate message-passing over a communication conduit between software processes in a computing environment. More particularly, the implementations described restrict access of one process to another via messages passed over a particular conduit connecting the processes and the access-control restrictions are defined by a contract associated with that particular conduit.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like elements and features.

DETAILED DESCRIPTION

The following description sets forth a permission-based mechanism (e.g., for an OS) for controlling the access of a software processes to other software processes via message-based inter-process communicative channels which connect the processes. With one or more of the implementations described, a channel contract associated with a channel defines what access-operations (and/or patterns of access-operations) that a process is permitted to perform via the associated channel. Herein, access-operations are performed via message-passing over a channel from one process to another.

One or more of the implementations described herein focus on the actual permissions necessary in order to be allowed to perform one or more access-operations over a channel. The permissions discussed herein may cover multiple and different operations. So, for example, the "write" permission might control a number of different operations.

There are many types of permissions; some of the most common include reading, writing, and executing. The access-operations (for which the permissions are associated) may be categorized. For instance, when the object being protected is a piece of media such as a movie, operations such as "play" and "view special features" may both be categorized as "viewing" operations, and they may be treated together for permission purposes.

With one or more of the implementations described, a receiving process is guaranteed to receive only access-operations specified by the channel contracts of the communications channels attached to the receiving process. Furthermore, a process holding a binding to a communications channel of a particular type can, at the discretion of its communicating peer, be guaranteed access to all the access-operations permitted by that channel.

The following co-pending patent applications (which are commonly owned by the same assignee as this application) are incorporated herein by reference:

- U.S. patent application Ser. No. 11/005,562, which was filed on Dec. 6, 2004 and is titled "Operating-System Process Construction." Herein, the application is called the "Operating-System Process Construction." The application provides details on the creation of isolated processes.
- U.S. patent application Ser. No. 11/007,655, which was filed on Dec. 7, 2004 and is titled "Inter-Process Communications Employing Bi-directional Message Conduits." Herein, the application is called the "Inter-Process Communications Employing Bi-directional Message Conduits." The application provides details regarding inter-process communication between isolated processes.

Exemplary Inter-Process Communication (IPC)

In the realm of computer science and, more particularly, in the art of OSs, the term "software process" (or more simply, "process") is well-known. Applications are often composed of one or more processes. The OS is aware of and, indeed, may manage and supervise one or more separate processes running on a computer.

One or more implementations described herein are part of or are facilitated by an OS. More particularly, the implementations described are part of or work in cooperation with a mechanism of the OS that allows for inter-process communications for software processes to exchange data and signal events.

Figure 1:
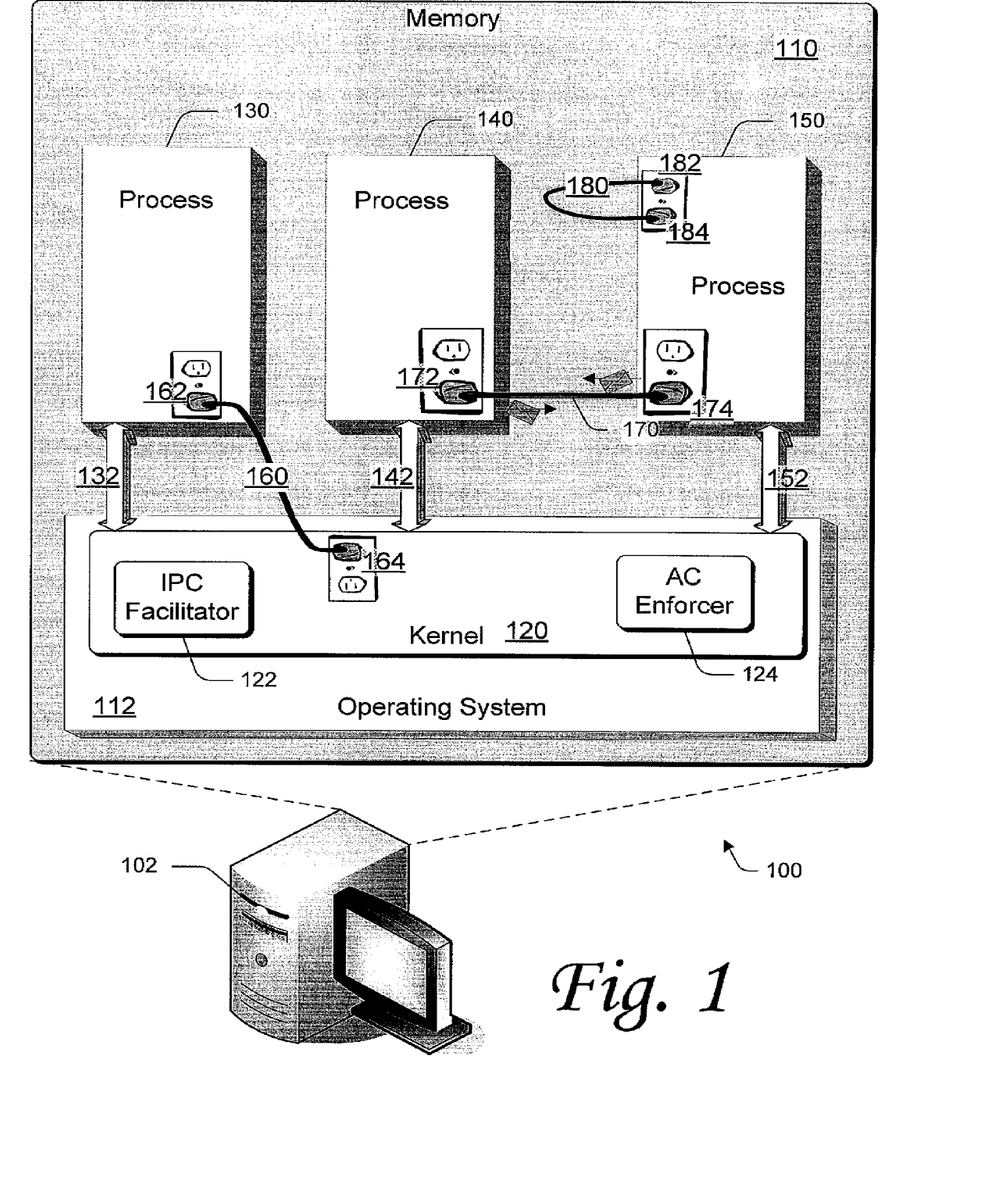
FIG. 1 is an operational scenario for an operating system architecture that supports one or more implementations described herein.

FIG. 1 illustrates an exemplary inter-process communication (IPC) architecture 100 that is suitable to accommodate one or more of the implementations described herein. The IPC architecture 100 offers a message-passing IPC communication mechanism.

Using the exemplary IPC architecture 100, software processes communicate by exchanging messages through bidirectional, strongly typed, higher-order channels. The type of a channel describes its communications protocol as well as the values it transfers. A channel is strongly typed by a computer-readable channel contract, which specifies various characteristics of the channel including specifying permissions on the message sent across the channel. Herein, the channels may also be called "inter-process message-passing conduits."

Generally, messages may include function invocation, signals, and/or data. Herein, the focus is a message as a vehicle to perform, or, perhaps, request performance of, some operation that allows the message-sender to gain access to, in particular, another process or a resource controlled by another process. A resource may be, for example, a file, device, internet connection, etc.

Because the operations involve access of some kind, they are called, herein, "access-operations." Herein, access-operations are performed via message-passing over a channel from one process to another.

Many types of access-operations exist. Examples of some access-operations include reading; writing; executing, ability to change access permissions; ability to enumerate; ability to create (as opposed to write); ability to delete; ability to invoke a method in a remote interface; ability to make internet connections outside of the local domain; ability to append to a file; to stop or resume a computation; or to view the balance of a bank account or to transfer money out of an account. In particular application, there will particular access-operations applicable to that application.

As depicted in FIG. 1, the exemplary IPC architecture 100 is implemented on a computer 102. The computer 102 typically includes a variety of processor-readable media, including a memory 110. Such media may include any available media that are accessible by the computer 102 and include both volatile and non-volatile media, removable and non-removable media.

An OS 112 is shown stored in the memory 110 and is executed on the computer 102. OS 112 has a kernel 120. The OS kernel 120 incorporates an IPC facilitator 122 and an Access-Control (AC) enforcer 124. The OS kernel 120 may construct one or more processes. FIG. 1 shows, for example, three active processes (130, 140, and 150) running in the memory 110.

The IPC facilitator 122 facilitates communications among active processes (such as processes 130, 140, and 150). More particularly, the IPC facilitator 122 facilitates establishment of message-passing inter-process channels between processes. FIG. 1 illustrates the OS kernel 120 implementing the IPC facilitator 122, while other implementations may have an IPC facilitator that is external to the OS kernel. If so, each would work in cooperation and/or coordination with the OS.

The AC enforcer 124 enforces access-control when one active process (such as processes 130, 140, and 150) attempts an access-operation on another process. More particularly, the AC enforcer 124 obtains and examines channel contracts associated with established, or to-be established, channels. Based upon the permissions expressed in that contract, the AC enforcer 124 permits message exchanges that are allowed by the contract. Conversely, the AC enforcer 124 restricts message exchanges that are specified by the contract.

The enforcement mechanism (e.g., AC enforcer 124) may do a lot of its job by examining the contracts of the communicating parties, before any actual communication takes place. E.g., if the enforcement mechanism determines that a process P has authority A and that is sufficient for doing a "read" of some resource owned by Q, and the process P never makes any other request, then P may be allowed to run and make requests on Q without any further checks at run-time.

The enforcement mechanism may also work at run-time. For each request it can decide whether it should be granted or not.

FIG. 1 illustrates the OS kernel 120 implementing the AC enforcer 124, whereas other implementations may use an AC enforcer that is external to the OS kernel. FIG. 1 shows the IPC facilitator 122 and the AC enforcer 124 existing separately. However, other implementations may incorporate together the functionality of the IPC facilitator and the AC enforcer.

In other implementations, the functionality of the AC enforcer 124 is performed in a distributed fashion across many components. Most specifically, this AC enforcer functionality may be performed by whatever component establishes a IPC channels. The destination process may decide whether to allow the channel to be opened. Similarly, a process can open a channel to itself, and then decide to give the other end to another process.

The "Inter-Process Communications Employing Bi-directional Message Conduits" (referenced above) discloses additional details regarding the exemplary IPC architecture 100, which is suitable for one or more of the implementations described herein.

Channels

Using the IPC architecture 100, a channel is a bi-directional message-passing channel (e.g., conduit) between two processes and the conduit has two endpoints. In some implementations, the channel is limited to exactly and only two endpoints. The endpoints are sometimes called the channel peers.

In one or more of the implementations described, a channel delivers messages without loss and in order. Also, the messages are retrieved in the order in which they were sent. Semantically, each endpoint has a receive queue, and sending on an endpoint enqueues a message on the queue of the peer.

Channels are described by computer-readable channel contracts associated with the channels. In other words, the contract of each channel specifies the inter-process communications restrictions over that channel, such as limitations on the messages that may be sent over the channel to the other processes. In one or more of the implementations described, the two ends of a channel are not symmetric. For descriptive purposes herein, one endpoint is called the importing (Imp) end and the other is called the exporting (Exp) end. Also, the Imp end is commonly called the client and the Exp end is commonly called the sewer. They are distinguished at the type level with types C.Imp and C.Exp, respectively, where C is the channel contract governing the interaction.

FIG. 1 illustrates channels metaphorically as electrical plugs, cords, and outlets. In at least one of the implementations described, channels have exactly and only two endpoints and each endpoint is owned by a process. As depicted, channel 160 links process 130 and OS kernel 120 and has only two endpoints 162 and 164. Channel 170 links process 140 and process 150 and has only two endpoints 172 and 174. Channel 180 is a newly formed channel that initially links process 150 to itself but still has only two endpoints 182 and 184.

These channels are represented by a graphic metaphor of an "electrical cord" with exactly two "plugs" representing the endpoints. Rather than conducting electricity, these "cords" conduct messages being sent and received by each participant where the "cord" is plugged in. This bi-directional message passing is illustrated by the directional envelopes next to channel 170.

This is illustrated by channel 160 and channel 170 in FIG. 1. Channel 160 links process 130 and OS kernel 120 and only those two. Channel 170 links process 140 and process 150 and only those two.

As illustrated in FIG. 1, each of the bi-directional IPC channels has two channel endpoints. Each channel endpoint is owned by one process at a time. For example, one channel endpoint is owned by one process and the other channel endpoint is owed by another process or is owned by the kernel of the operating system.

In one or more of the embodiments described, channel communication is asynchronous. As long as a process abides by the channel contract, the process may send multiple messages through the channel without waiting for the recipient process to receive the messages.

Channel Contracts

Channel contracts, i.e., conduit contracts, are employed by the implementations described herein in order to facilitate the process isolation architecture. Channel contracts (and other aspects of inter-process communication) are also described in "Inter-Process Communications Employing Bi-directional Message Conduits" (referenced above).

Using the IPC architecture 100, channels are strongly typed by a "channel contract." The channel contract defines the relationship between the two endpoints of a channel which are illustrated as electrical plugs/outlets in FIG. 1.

Figure 2:
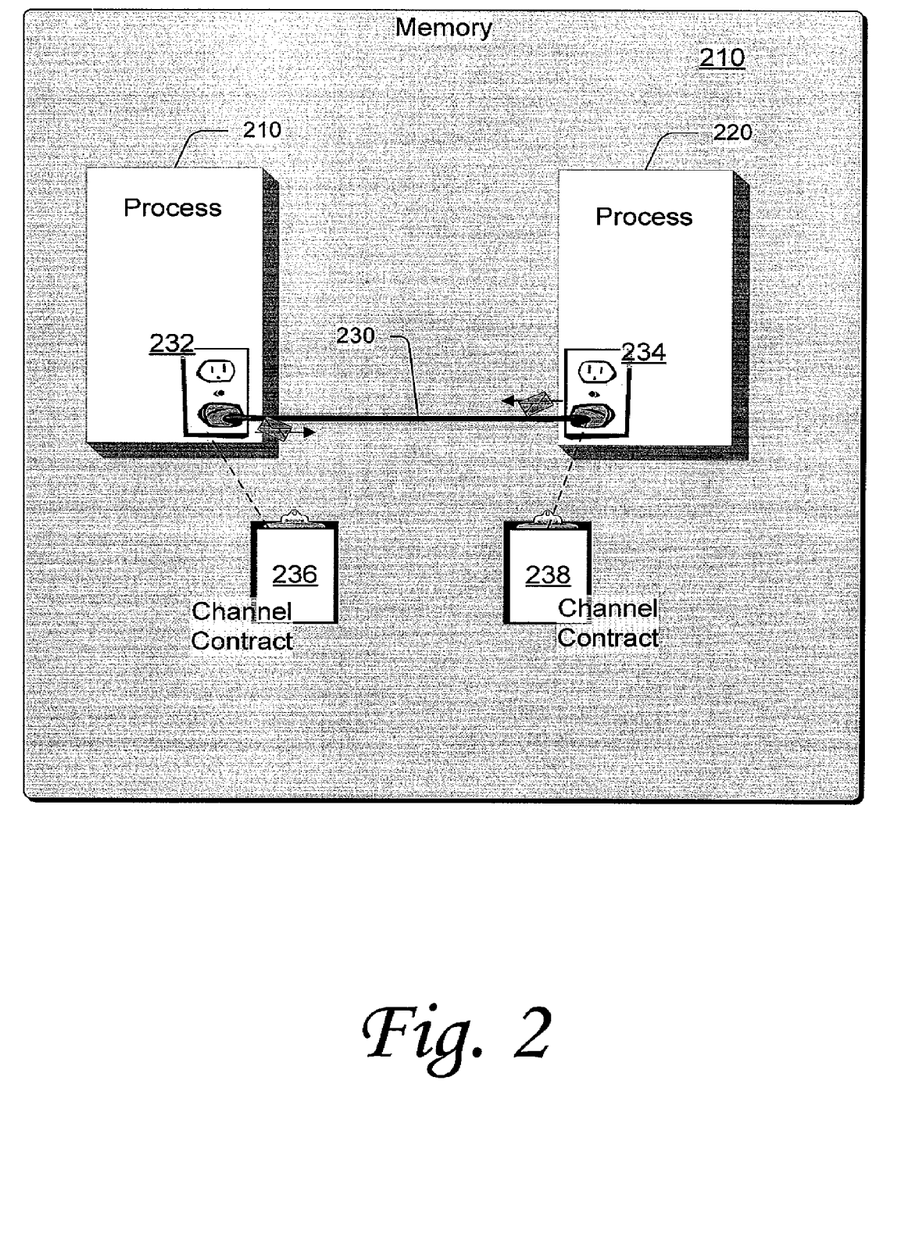
FIG. 2 is a cropped-in view of a portion of the scenario shown in FIG. 1 with some additional details added.

FIG. 2 shows a version of a portion of the same the IPC architecture 100 shown in FIG. 1. In particular, FIG. 2 depicts just two processes 220 and 230 in a memory 210. It also shows their shared channel 230 with its endpoints 232 and 234 and the channel contracts 236 and 238 associated with that channel.

In one or more of the implementations described, the channel contracts are associated with an endpoint. For example, contract 236 is associated with endpoint 232 and contract 238 is associated with endpoint 234. Since each endpoint is owned by a process, the contracts are associated inferentially with a process. For example, process 220 owns endpoint 232; therefore, process 220 is associated effectively with contract 236. However, this process-to-contract association is indirect and circumstantial. The contract does not link directly to or refer to the process. Rather, the contract is associated with its endpoint.

In general, a channel contract is a data set that defines a set of messages that may be sent through the channel and a specification or description of the allowable sequences of message exchange through the channel. The set of endpoint states and the allowable transitions between those states, in terms of messages sent or received, are derivable directly from the channel contract. The channel contract definition is sufficiently explicit and constraining that executable code implementing either end of a channel contract may be statically or dynamically checked for conformance to the contract.

Furthermore, with particular relevance to the implementations described herein, The channel contract describes declaratively, what permissions are involved in the operations in a contract, and which operations are guarded by which permissions. At runtime, whenever a channel is created, a subset of the permissions described in the contract is actually associated with the channel instance. Subsequently, whenever there's an operation on the channel, the infrastructure checks that the channel instance has the permission specified in the contract declaration for that operation.

As an example, if a channel is created with all permissions described in the contract, then all subsequent operations will succeed. If a channel is created with no permissions, then every permission guarded operation on the channel will fail.

Because the contract is not associated directly with the process, the permissions defined by the contract are not directly associated with the process. Instead, the permissions are contract-specific. In other words, permissions are defined in terms of the messages of a contract and the current message-passing state.

Another way to look at this is that permissions are contract-specific, but that permissions (or permission categories) with similar meaning may be given the same name in multiple contracts. Thus, the system might use a "read" permission for things as diverse as files, calendar entries, drawing elements, and ACLs; using the same name helps specify rights in a concise, understandable manner. Similarly, a "play" permission might be used for all multimedia objects (where playing is distinct from reading, e.g., in that the content's bits aren't just read, but rendered fully).

Exemplar Contracts

The permissions annotate the channel contracts effectively. In order to better illustrate the use of permissions with channel contracts, a simple example of a contract is provided below. The example might contain part of the contents of contract 236. The particular example demonstrates both read and read/write access-operations.

```
contract StringDictionaryContract {
    in message Lookup(String key);
    in message Insert(String key, String value);
    out message LookupAck(String value);
    out message LookupNack;
    out message InsertAck;
    out message InsertNack;
    START: one {
        Lookup ? -> LOOKUP-ACK ;
        Insert ? -> INSERT-ACK ;
    }
    LOOKUP-ACK: one {
        LookupAck! -> START;
        LookupNack! -> START;
    }
    INSERT-ACK: one {
        InsertAck ! -> START;
        InsertNack ! -> START;
    }
}
```

In one or more of the implementations described, each message in the contract must be annotated within the following format: [permission:name]. Using this format, the name is an arbitrary string identifier, tied to the contract, that identifies a set of messages.

Below is an example contract with annotations for read and write operations.

```
contract StringDictionaryContract {
   permission read;
   permission write;
   [permission:read]
   in message Lookup(String key);
   [permission:write]
   in message Insert(String key, String value);
   out message LookupAck(String value);
   out message LookupNack;
   out message InsertAck;
   out message InsertNack;
   START: one {
      Lookup ? -> LOOKUP-ACK ;
      Insert ? -> INSERT-ACK ;
   }
   LOOKUP-ACK: one {
      LookupAck! -> START;
      LookupNack! -> START;
   }
   INSERT-ACK: one {
      InsertAck ! -> START;
      InsertNack ! -> START;
   }
}
```

As shown in the above example, each permission type is identified by a name, such as "read" and "write", which is an arbitrary string declared at the beginning of a contract. The name is scoped by the contract containing it. The same permission names may be used in different contracts. Consequently, it may be useful to establish system-wide agreement on various specific permission names, such as "read" and "write". Some implementations may do that and some may not.

In this example, a particular client endpoint of the contract, the so-called ".Imp" side, is constrained to a set of named permissions, which in turn limits the set of messages the receiving process can send in each state.

```
contract StringDictionaryContract {
   [permission:read]
   in message Lookup(String key);
   out message LookupAck(String value);
   out message LookupNack;
   out message InsertAck;
   out message InsertNack;
   START: one {
      Lookup ? -> LOOKUP-ACK ;
   }
   LOOKUP-ACK: one {
      LookupAck! -> START;
      LookupNack! -> START;
   }
   INSERT-ACK: one {
      InsertAck ! -> START;
      InsertNack ! -> START;
   }
}
```

Endpoints may be expressed as message argument types that specify the permissions associated with the endpoint as shown above.

```
contract FooService {
   message Connect(StringDictionaryContract[read].Imp! arg);
   ...
```

The permission framework, described thus far, can be extended in various ways. For example, the framework might be extended to permit annotations such as [permission:X,Y] on messages, thereby specifying a disjunction of permissions, namely that the message can be sent either with permission X or Y.

The framework could be extended to define a full or partial order among permissions. For example, with this approach, permissions may be defined in this manner: "read" and "readwrite", where "readwrite"<="read". This ensures that the "readwrite" permission always implies the read permission.

For example, the following may define some partial ordering for permissions:

```
contract StringDictionaryContract {
   permission all;
   permission read <= all;
   permission write <= all;
   ...
```

Alternatively, instead of associating permissions, or sets of permissions, with the names of messages, one or more implementations might employ a dynamic, i.e., temporal, labeling of the permission. For example, permissions, or sets of permissions, might be associated with individual state-to-state transitions associated with messages. For example, from a state "S1" a message "Lookup?" might map to a state "S2" for a process with permission "P1, " but might be forbidden for a process that does not have permission "P1, " while from a state "S3" a message "Lookup?" might map to a state "S4" only for someone with a different permission "P2. "

```
contract StringDictionaryContract {
   permission read;
   permission write;
   permission restart;
   in message Lookup(String key);
   in message Insert(String key, String value);
   in message Clear( );
   in message Freeze( );
   in Message Email(String destEmailAddress);
   out message LookupAck(String value);
   out message LookupNack;
   out message InsertAck;
   out message InsertNack;
   out message ClearAck;
   out message ClearNack;
   out message FreezeAck;
   out message FreezeNack;
   START: one {
      [permission:read] Lookup ? -> LOOKUP-ACK ;
      [permission:write] Insert ? -> INSERT-ACK ;
      [permission:write] Clear ? -> CLEAR-ACK ;
      Freeze ? -> FREEZE-ACK ;
   }
   LOOKUP-ACK: one {
      LookupAck! -> START;
      LookupNack! -> START;
   }
```

-continued

```
INSERT-ACK: one {
    InsertAck ! -> START;
    InsertNack ! -> START;
}
CLEAR-ACK: one {
    ClearAck! -> START;
    ClearNack! -> START;
}
FREEZE-ACK: one {
    FreezeAck ! -> DONE ;
    FreezeNAck ! -> START ;
}
DONE: one {
    [permission:restart] Clear? -> START ;
    [permission:read] Email? -> DONE ;
}
}
```

In the above example, the permissions are associated with transitions. In this example, there are additional operations for clearing and for freezing the dictionary. A client who can write the dictionary is allowed to clear it, as long as the dictionary has not been frozen. Once the dictionary has been frozen, clearing the dictionary requires a different permission, namely the permission to restart the dictionary.

Alternatively, permissions may still be associated with transition paths. In order to illustrate how permissions are associated with transition paths, consider the basic explanation of the dictionary, with simple permissions, add a declaration of the new permission "edit", and add a requirement: If a sequence of transitions contains Insert(key) followed by InsertAck( ) twice, for any key, then the client has the permission "edit".

This may be written informally in English. This also can be written in temporal logic, as follows:

```
[permission:edit]
    Exists k. ◇ (Insert(k) ∧ ○ (InsertAck( ) ∧ ◇ (Insert(k) ∧ ○
InsertAck( )))) ...
        Here □ means eventually and ○ means next
```

Sub-typing Induced by Permissions

One or more of the implementations described employ a family of sub-contracts for each subset of possible permissions. For each such sub-contract, corresponding types may exist for the associated endpoint, e.g., the importing endpoint or "Imp".

With one or more implementations described, one may define a contract such that a single message can be used to transition between two pairs of states. So, for example, you might have two state pairs:

```
OpenState: OpenMsg? -> OpenReplyState
OpenSpecialState: OpenMsg? -> OpenSpecialReplyState
```

With this approach, one may require different permissions to make these two transitions. Hence, the permissions are associated with the state transitions themselves, and not the OpenMessage message.

Contract inheritance provides sub-typing for exporting endpoints. Permissions add a sub-typing hierarchy to importing endpoints as follows, for example: Given two endpoint types, C[P].Imp and C[Q].Imp, where P and Q are permission sets, then C[P].Imp is a subtype of C[Q].Imp if Q is a subset of P.

A sub-type is a term commonly used in the realm of "object-oriented" programming. In general, S is a subtype of T if every S is a T.

Using one or more of the implementations described, a sub-typing relationship may be defined among channel endpoints. For example, applying the StringDictionary examples given above, the following sub-types of relationships might be obtained:

```
StringDictionary[read].Imp <= StringDictionary.Imp
StringDictionary[write].Imp <= StringDictionary.Imp
StringDictionary[read,write].Imp <= StringDictionary[read].Imp
StringDictionary[read,write].Imp <= StringDictionary[write].Imp
```

The relationships described above are natural in that a client is allowed to use only a subset of the functionality of a channel. In order for these sub-type relationships and the corresponding upcasts to be sound, one implementation might impose restrictions on contracts with permissions, such as the following restriction, for example: Permissions are only associated with messages sent from the Imp side to the Exp side. Messages sent by the Exp side are visible under all permission sets.

Restrictions, such as the exemplary one, guarantees that clients can upcast the Imp endpoint to fewer permissions in any state. If the state is a send state for the client, the upcast may result in fewer possible messages the client can send. If no messages can be sent from a state under a set of permissions, the state is terminal. If the upcast of the client side endpoint happens in a client receive state, the client still needs to handle incoming messages sent by the server, because messages in the server-client direction do not have associated permissions.

In some implementations, a restriction might specify that downcasts on Imp endpoints, i.e., where the Imp attempts to gain more permissions, are not permitted. The restriction might be enforced even if the exporter that originally granted permission allowed an equal or greater permission and the endpoint was subsequently upcast. The restriction might be useful for maintaining order and security in an environment where endpoints can be passed to other processes.

In many of the implementations described herein, the focus has been on the rights of clients when they make requests from servers. However, in alternative implementations, the opposite may be true. The focus could be on the rights of servers when they make requests from clients.

Enforcement of Permissions on a Channel

Because one or more of the implementations described employ a strong-type system with contracts and channel endpoints, the run-time environment can enforce access control permissions on a communications channel without additional runtime checks at the destination processes.

Using the implementations described, it should not, in general, be necessary for applications to manipulate and query permissions on channels. The strong-type system should enforce the rule that all interaction sequences, according to the endpoint types, are permissible and safe. The AC enforcer 124 will check that communications over channels comply with the contract-specified protocol, including the permissions associated with a channel. In the event that a permission fault is detected, an error should be declared.

The AC enforcer 124 enforces dynamic access control at the time of binding. Herein, "time of binding" refers specifically to "dynamic" binding, when a process accepts a new connection, e.g., channel, based upon a particular contract.

At the time of binding, the AC enforcer 124 controls the acceptability of new endpoints and the permissions implied. Once binding is accomplished, permissions need not be checked again by the executable instructions of the process. Instead, the enforcement of permissions is now a matter of protocol conformance to the contract specified.

More specifically, in one of the implementations described, channel binding occurs in two exemplary cases. In both cases, a channel endpoint is passed over an existing channel. However, in one case the resulting channel is bound to a named object in the namespace, i.e., namespace is a set of names in a naming system, and in the other case the channel is anonymous.

In one implementation described, anonymous channels are much like "capabilities" in that the access control system does not constrain the passage of endpoints between cooperating processes, unless such movement is constrained. See below for more discussion regarding "capabilities" and a "capability-system."

When the exporter endpoint is presented to a service provider for binding to a named object, an access-control decision is made. The code that implements the name service binding queries the incoming endpoint to determine what dynamic, e.g., maximal, permissions are associated with the channel.

Access-Control Failure

In some instances, of course, the check for access control will fail. Conventionally, when permission is not satisfied, a system throws an exception. In the implementations described herein, the access occurs when messages are sent via channels. However, it may be desirable to avoid an "access-control" failure when messages are sent.

So, one approach for handling access-control failure is to let the access attempt (e.g., the "send") on the sender side succeed. But, if the permission was not satisfied, the channel infrastructure would not deliver the message and remember that the last send(s) caused a permission violation. On the next receive performed on that endpoint, the infrastructure would return a special message such as PermissionDenied( ).

Capability-Based Security Using IPC with Access-Control Permissions

One or more implementations of the inter-process communication with channel-contract defined access-control permissions may be employed within the context of a computing system using capability-based security. In short, capability-based security uses a special "token" or "key" for a program in order to gain access to an object, such as a file, data, or another program. With this token, a program has the authority to perform one or more specific actions on that object. Such a token is known as a "capability."

Like a car key on a key ring, the security system does not care which program is using the token or "capability." The security system cares only that the capability is the correct "key" by which to gain access correctly to the desired object. Like car keys, capabilities can be transferred, i.e., delegated; and, like car keys, capabilities may be copied.

In a capability-based computer system, all access to objects is performed using capabilities, and capabilities typically provide the key to accessing objects. In such a system, every process holds a set of capabilities. If process A holds a capability to communicate with process B, the two programs can grant capabilities to each other Typically, a process obtains new capabilities by having them granted to the process as a result of some communication.

Using one or more of the implementations described herein, the channel contracts, having defined access-control permission contained therein, act as a "capability" described above and the AC enforcer 124 enforces the capability-based security. More particularly, the "binding" of processes via a channel having a channel contract acts as a "capability." A "binding" is a programmatic representation of a channel that has been successfully established between the current program context a named entity. From this point of view, true capability systems do not support explicit binding, except perhaps through a naming system on the side.

In such an implementation, communication between processes is achieved by first obtaining a binding to another process, with a particular channel having a particular contract type that defines a particular set of permissions. Because of the contract, at the time of the binding the processes know the kind of messages, i.e., the kind of access-operations, may be exchanged over the channel, in which order the messages are exchanged, and other constraints. The process that holds the binding of the channel between two processes has the right to perform a set of permitted access-operations which causes the process at the other end of the channel to act in some manner.

Herein, the AC enforcer 124 controls access to an object or process effectively by overseeing and controlling the proper binding of processes. In this way, the AC enforcer controls the propagation of the "capability" between processes. Consequently, a process holding a binding to a communications channel of a particular type can, at the discretion of its communicating peer, be guaranteed access to all of the access-operations permitted by the channel that are held by the peer.

Methodological Implementation

Figure 3:
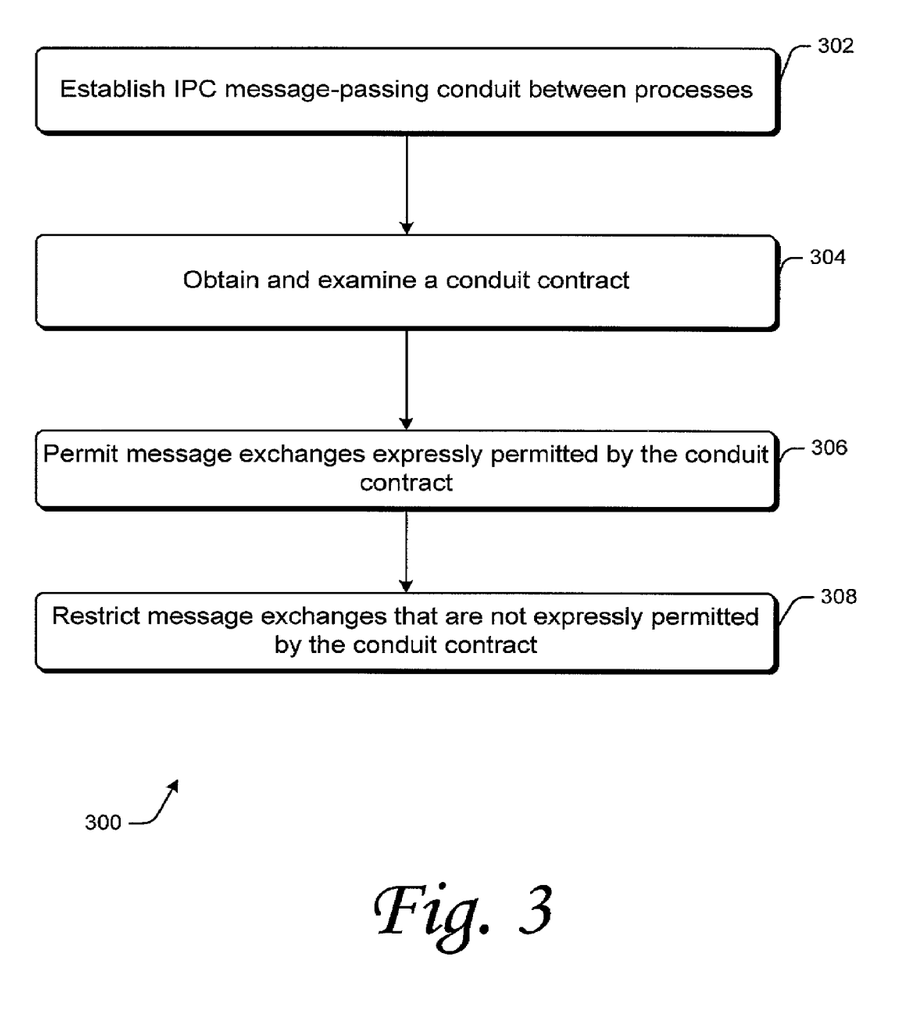
FIG. 3 is a flowchart of another methodological implementation described herein.

FIG. 3 shows method 300 for implementing access-control using the message-passing IPC and contracts that defined the permitted access-control. Method 300 is performed by one or more of the various components as depicted in FIGS. 1 and 2.

At block 302 of FIG. 3, an OS facilitates the establishment of an inter-process message-passing conduit between one software process and a second software process. In one or more of the implementations described, the inter-process message-passing conduit has two endpoints. One software process owns one endpoint and the second software process owns the other endpoint.

At block 304, the OS obtains and examines a processor-readable, e.g., computer-readable, conduit contract that is associated with the inter-process message-passing conduit just established or re-established. The OS associates the conduit contract with the just established inter-process message-passing conduit.

With one or more implementations, the conduit contract is a computer-readable text file stored in a computer memory in association with the first and second processes. In some implementations, the second process returns the conduit contract from the second software process to the first software process. The conduit contract specifies the characteristics of messages that are allowed to be sent from the first software processes to the second software processes via the inter-process message-passing conduit.

Herein, the message characteristics specified by the conduit contract include one or more access-operations, e.g., read, write, read/write, and execute, that direct the second software process to perform a function. In addition, the characteristics may include a definition of the set of message types that are allowed to transport through the inter-process message-passing conduit. A message type being, for example, one or more particular access-operations. Furthermore, the characteristics may include a description of allowable sequences or ordering of message exchanges between the first and second software processes through the inter-process message-passing conduit.

At block 306, a run-time environment permits a conditional exchange of one or more messages via the inter-process message-passing conduit from the first software process to the second software process. Messages are allowed to be exchanged under the conditions by which the messages to-be-exchanged meet the specified message characteristics of the conduit contract.

Conversely, at block 308, the run-time environment prevents conditionally an exchange of one or more messages via the inter-process message-passing conduit from the first software process to the second software process. Messages are not allowed to be exchanged under the conditions by which the messages to-be-exchanged fail to meet the specified message characteristics of the conduit contract.

Therefore, unlike a conventional OS in which the ACL table is used to look-up the permissions for each access request, one or more of the implementations described rely on a permission-defining contract that is associated with an established communications link between processes. Unlike the conventional ACL look-up table, the link itself defines who is accessing to whom. Unlike the conventional ACL look-up table, the parameters establishing the link—which is defined by the contract—specify the access-control permission for the connected processes.

Outside of or during this process, perhaps before the establishment of the conduit, the OS may analyze the first software process to confirm that the first software process will, when executed, only send messages, via the conduit, that meet the specified message characteristics of the conduit contract.

CONCLUSION

One or more of the implementations described thus far focused on software processes communicating by exchanging messages through bidirectional, strongly typed, higher-order channels. Other implementations may use other mechanisms for message-passing communication among components or objects of a computing environment, e.g., software processes, applications, kernels, OSs, etc., where the permissions are connected to the messages being passed. For example, some implementations may employ Remote Procedure Calls (RPCs), Simple Object Access Protocol (SOAP), Common Object Request Broker Architecture (CORBA), Remote Method Invocation (RMI), and the Distributed Component Object Model (DCOM).

The term "software process" or "processes" is used herein for convenience, and is not intended to limit the scope of this concept. Indeed, this concept can be implemented in software, hardware, firmware, or a combination thereof.

The techniques, described herein, may be implemented in many tangible ways, including, but not limited to, program modules, i.e., software, hardware, firmware, or a combination thereof. One or more implementations described herein may be implemented via many well-known computing systems, environments, and/or configurations that are suitable for use. Examples of such include, but are not limited to: personal computers (PCs), server computers, hand-held or laptop devices, multiprocessor systems, microprocessor-based systems, programmable consumer electronics, wireless phones and equipments, general- and special-purpose appliances, commercial electronics, application-specific integrated circuits (ASICs), network PCs, thin clients, thick clients, set-top boxes, minicomputers, mainframe computers, distributed computing environments that include any of the above systems or devices, and the like.

Although one or more of the above-described implementations were described in language specific to structural features and/or methodological steps, it is to be understood that other implementations may be practiced without the specific exemplary features or steps described herein. Rather, the specific exemplary features and steps are disclosed as preferred forms of one or more implementations. In some instances, well-known features may have been omitted or simplified to clarify the description of the exemplary implementations. Furthermore, for ease of understanding, certain method steps are delineated as separate steps; however, the steps delineated separately should not be construed necessarily as order dependent in their performance.

The invention claimed is:

1. A method comprising:
   facilitating, by a processor, establishment of an inter-process message-passing conduit between a first software process and a second software process, the inter-process message-passing conduit being a bi-directional channel having exactly and only two asymmetric endpoints, wherein the first software process owns one endpoint and the second software process owns the other endpoint;
   obtaining a processor-readable conduit contract, the conduit contract specifying permissions for access-operations that are allowed to be sent by one or more messages from the first software process to the second software process by the inter-process message-passing conduit, wherein one or more permissions are specified by the conduit contract; and
   permitting an exchange of one or more messages by the inter-process message-passing conduit from the first software process to the second software process, the exchange being permitted only when one or more of the to-be-exchanged messages explicitly meet the positively specified permissions of the conduit contract, wherein the positively specified permissions of the conduit contract comprise a specified set of access-operation types that are allowed to be sent by a message through the inter-process message-passing conduit, and wherein the positively specified permissions of the conduit contract further comprise a defined pattern of the access-operations types that are allowed to be sent by the one or more messages through the inter-process message-passing conduit.

2. The method as recited in claim 1, wherein one or more permissions are specified by the conduit contract by providing a qualifying condition when one or more permissions are active and a definition of the one or more access-operations permitted when that qualifying condition occurs.

3. The method as recited in claim 1, wherein the method further comprises analyzing the first software process to confirm that first software process sends-by one or more messages through the inter-process message-passing conduit-only access-operations that are permitted in accordance with the specified permissions of the conduit contract.

4. The method as recited in claim 1, wherein the permissions specified by the conduit contract define a super-type set, the super-type set being hierarchical related to one or more sub-type permissions.

5. The method as recited in claim 1, wherein obtaining further comprises the second software process providing the first software process with the processor-readable conduit contract.

6. An operating system comprising the method as recited in claim 1.

7. A method comprising:
   facilitating, by a processor, establishment of an inter-process message-passing conduit between a first process and a second process, the inter-process message-passing conduit comprising a bi-directional channel having a first end point associated with the first process and a second endpoint associated with the second process, wherein the first endpoint is structurally different than the second endpoint;
   obtaining a processor-readable conduit contract, the conduit contract being associated with the established inter-process message-passing conduit and the conduit contract positively specifying permissions for access-operations that are allowed to be sent by one or more messages from one of the conduit-linked software processes to a particular other conduit-linked software processes by the inter-process message-passing conduit; and
   permitting an exchange of one or more messages by the inter-process message-passing conduit from the one of the conduit-linked software processes to the particular other conduit-linked software processes, the exchange being permitted only when one or more of the to-be-exchanged messages explicitly meet the positively specified permissions of the conduit contract, and the one or more permitted messages include only those messages which include access-operations explicitly permitted by the conduit contract, wherein the specified permissions of the conduit contract comprise a specified set of access-operation types that are allowed to be sent by the one or more messages through the inter-process message-passing conduit, and wherein the specified permissions of the conduit contract further comprise a defined pattern of the access-operations types that are allowed to be sent by the one or more messages through the inter-process message-passing conduit.

8. The method as recited in claim 7, wherein one or more permissions are specified by the conduit contract by providing an identifying name of the one or more permissions and a definition of the one or more access-operations permitted.

9. The method as recited in claim 7, wherein one or more permissions are specified by the conduit contract by providing a qualifying condition when one or more permissions are active and a definition of the one or more access-operations permitted when that qualifying condition occurs.

10. The method as recited in claim 7, wherein the inter-process message-passing conduit is a bi-directional channel having at least two endpoints.

11. The method as recited in claim 7, wherein obtaining further comprises the particular other of the conduit-linked software processes providing the one of the conduit-linked software processes with the processor-readable conduit contract.

12. A method comprising:
   establishing, by a processor, an inter-process message-passing conduit between a first software process and a second software process, wherein the inter-process message-passing conduit is a bi-directional channel having two asymmetrical endpoints, wherein the first software process owns one endpoint and the second software process owns the other endpoint, wherein establishing the inter-process message-passing conduit between the first software process and the second software process comprises:
      facilitating sending of a processor-readable conduit contract from the second software process to the first software process, the conduit contract specifying permissions for access-operations that are allowed to be sent by one or more messages from the first software processes to the second software processes by the inter-process message-passing conduit, wherein one or more permissions are specified by the conduit contract by providing an identifying name of the one or more permissions and a definition of the one or more access-operations permitted; and
   after the establishing, preventing an exchange of one or more messages by the inter-process message-passing conduit from the first software process to the second software process, the exchange being prevented when one or more of the to-be-exchanged messages include access-operations that fail to meet the specified permissions of the conduit contract, wherein the specified permissions of the conduit contract comprise a specified set of access-operation types that are allowed to be sent by one or more messages through the inter-process message-passing conduit, and wherein the specified permissions of the conduit contract further comprise a defined pattern of the access-operations types that are allowed to be sent by the one or more messages through the inter-process message-passing conduit.

13. The method as recited in claim 12, wherein one or more permissions are specified by the conduit contract by providing a qualifying condition when one or more permissions are active and a definition of the one or more access-operations permitted when that qualifying condition occurs.

\* \* \* \* \*